(12) United States Patent
Hardie

(10) Patent No.: US 7,512,077 B2
(45) Date of Patent: Mar. 31, 2009

(54) COMPENSATION FOR INDEPENDENT CLOCKS IN RELAYED COMMUNICATION OVER PACKET-BASED NETWORKS

(75) Inventor: Tony Hardie, Union City, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 588 days.

(21) Appl. No.: 11/219,352

(22) Filed: Sep. 1, 2005

(65) Prior Publication Data

US 2007/0047566 A1 Mar. 1, 2007

(51) Int. Cl.
*H04J 3/06* (2006.01)
*H04L 7/00* (2006.01)
*H04L 12/54* (2006.01)
*G06F 15/16* (2006.01)

(52) U.S. Cl. .................. 370/252; 370/412; 370/429; 370/516; 375/222; 375/371; 709/231; 709/246

(58) Field of Classification Search ............... 370/252, 370/412, 429, 516; 375/222, 371; 709/231, 709/246
See application file for complete search history.

(56) References Cited

U.S. PATENT DOCUMENTS

| | | | |
|---|---|---|---|
| 5,541,955 A * | 7/1996 | Jacobsmeyer ............. 375/222 |
| 5,912,895 A * | 6/1999 | Terry et al. ............... 370/445 |
| 6,327,264 B1 * | 12/2001 | Terry et al. ............... 370/445 |
| 6,587,473 B2 * | 7/2003 | Terry et al. ............... 370/445 |
| 6,654,348 B1 * | 11/2003 | Doty et al. ............... 370/244 |
| 6,757,367 B1 * | 6/2004 | Nicol ...................... 379/90.01 |
| 6,829,244 B1 * | 12/2004 | Wildfeuer et al. ......... 370/412 |
| 7,046,746 B1 * | 5/2006 | Keaney et al. ............ 375/341 |
| 7,065,036 B1 * | 6/2006 | Ryan ....................... 370/208 |
| 7,281,053 B2 * | 10/2007 | Mantegna et al. ......... 709/231 |

* cited by examiner

*Primary Examiner*—Alpus H Hsu
(74) *Attorney, Agent, or Firm*—Townsend and Townsend and Crew LLP

(57) ABSTRACT

Methods, apparatuses, and systems are presented for compensating for independent clocks in relayed modem communications involving receiving data packets from a first network device, forwarded over a packet-based network, at a second network device, the data packets representing data in a first modulated signal from a first modem, the first modulated signal being associated with a first symbol rate, placing data derived from the data packets into a queue in the second network device, generating a second modulated signal at the second network device for transmission to a second modem, the second modulated signal being generated using data retrieved from the queue and being associated with a second symbol rate, obtaining at least one queue size measurement associated with data in the queue, and effectively adjusting the second symbol rate based on at least one queue size measurement associated with data placed in the queue in the second network device.

27 Claims, 5 Drawing Sheets x x x x x x x x x x x x x x x x x x x x
⎵⎵⎵⎵⎵⎵⎵⎵⎵ ⎵⎵⎵⎵⎵⎵⎵⎵⎵
    410              412

COMPENSATION FOR INDEPENDENT CLOCKS IN RELAYED COMMUNICATION OVER PACKET-BASED NETWORKS

BACKGROUND OF THE INVENTION

FIG. 1 depicts an illustrative environment in which relayed modem communication is carried out over a packet-based network. As shown in the figure, a modem 102 is connected to network device 104, which is in turn connected to a packet-based network 106. Also connected to the packet-based network 106 is another network device 108, which in turn is connected to another modem 110.

Each of the modems 102 and 110 is capable of generating and receiving modulated signals that convey digital information. A wide range of modulation schemes may be implemented. These include different types of amplitude modulation such as quadrature amplitude modulation (QAM), different types of phase shift keying modulation such as quadrature phase shift keying modulation (QPSK), different types of frequency shift keying modulation (FSK), etc. The appropriate type of modulation scheme or schemes used may depend on the specific needs of a particular implementation. Some examples of data transfer standards that may be followed by modems 102 and 110 may include the V. 26, V.32, V.34, and other standards as recommended by the Comité Consultatif International Téléphonique et Télégraphique (CCITT), or Telecommunication Standardization Sector of the International Telecommunications Union (ITU). Modems 102 and 110 may be capable of either transmitting modulated signals in a bi-directional fashion or a uni-directional fashion.

Traditionally, modems 102 and 110 would be capable of transmitting modulated signals to one another over an analog medium. For example, the modulated signals may be transmitted over a co-axial cable, on twisted-pair wires, over the air, and so on. The modulated signals may also occupy different portions of the frequency spectrum. For example, the modulated signals may transmitted at baseband, intermediate frequency (IF), radio frequency (RF), etc.

However, an environment such as that shown in FIG. 1 allows modulated signals generated by modems 102 and 110 to be converted to packetized data and relayed over a packet-based network. The relay of modem communications over packet-based networks provides significant benefits by allowing modem communications to be carried out while taking advantage of additional bandwidth, efficient routing, improved control, and other significant benefits that may be associated with a packet-based network. FIG. 1 illustrates bi-directional communications between modems 102 and 110, relayed over packet-based network 106.

Communication of data in one direction, from modem 102 to modem 110, is described in detail below. However, communication of data in the other direction, from modem 110 to modem 102, may be carried out in a similar fashion. Referring FIG. 1, modem 102 receives digital data from a data source (not shown). The data source may be a computer, a voice-based device such as a telephone, a data connection, etc. Modem 102 generates a modulated signal 112 that represents the data received from the data source. For example, modulated signal 112 may be generated based on the data according to a particular modulation scheme. Modem 102 may also implement additional features such as secure transmission and error correction. For example, modem 102 may apply encryption and error correction coding to the data received from the data source. The data, which may be encrypted and coded with error correction codes, may then be represented by symbols in the relevant modulation scheme. Each symbol may correspond to one bit of data. Alternatively, each symbol may represent multiple bits of data. Just as an example, a QAM modulation scheme may utilize each of the four different types of symbols to represent two bits of data. The possible bit pairs represented by a particular symbol may be (0,0), (0,1), (1,0), and (1,1). The symbols are modulated according to the modulation scheme at a particular symbol rate. Typically, the symbol rate is derived from some sort of clock signal. The clock signal may be based on an external clock source, and internal oscillator, etc.

Network device 104 receives modulated signal 112 and demodulates it to produce bits of data. This data may still include the encryption and error correction coding applied by modem 102. The demodulation process may be implemented by digital signal processing (DSP) hardware 114. Furthermore, the data may be processed by a secure interface unit 116, which may apply an additional level of security to the data before network transmission. Different types of data security may be implemented, including known security protocols and variations thereof. For example, Secure Telephone Unit—third generation (STU-III), Future Narrowband Digital Terminal (FNBDT), and Secure Communications Interoperability Protocol (SCIP) are some known protocols that may be used. In some implementations, the data is encrypted according to the relevant security protocol by secure interface unit 116. In other implementations, the data is encrypted using the relevant security protocol by modem 102, and secure interface unit 116 merely passes along the encrypted data without modifying it. In yet other implementations, modem 102 applies one type of encryption, and secure interface unit 116 applies an additional level of encryption. In any case, network transport processing 118 converts the data into packets 120 appropriate for forwarding over packet-based network 104. This may involve dividing the data into portions that are then incorporated into different packets. Each packet may include different parts such as headers, body, error correction codes, etc. The packets may be constructed according to protocols defined at multiple levels of networking technology, as is known in the art. Just as one example, packets 120 may be Internet Protocol (IP) packets. Network device 104 thus transmits packet 120 to network 106.

Packets 120 may traverse network 106 via circuitous routes in accordance with the relevant protocols associated with network 106. Continuing with the previous example, network 106 may be implemented as an IP network, and packets 120 may be routed utilizing IP address information contained in packets 120.

Network device 108 receives packets 120 and converts the packets back into a format suitable for transmission to modem 110. Specifically, network device 108 may utilize network transport processing 121 to extract relevant data from packets 120. The data may be processed by a secure interface unit 122, which may remove any securing encoding or encryption applied by secure interface 116. Network device 108 then generates a modulated signal 126 that represents this data. The modulation process may be implemented by DSP hardware 124. Modulated signal 126 may be generated according to a particular modulation scheme at a particular symbol rate. As in the case of modulation signal 112, the symbol rate associated with modulated signal 126 may be derived from some sort of clock signal. The clock signal may be based on an external clock source, and internal oscillator, etc.

Modem 110 receives modulated signal 126 and performs demodulation to generated demodulated data. The demodulated data may incorporate encryption, error correction coding, etc., implemented by modem 102. Modem 110 may thus perform the relevant decryption and/or error correction decoding to the demodulated data to generate data bits suitable for transmission to a data destination (not shown). The data destination may be a computer, a voice-based device such as a telephone, a data connection, etc.

In the course of the data communication from modem 102 to modem 110 described above, the clock signal used to control the symbol rate of modulated signal 112 at the transmit end may differ from the clock signal used to control the symbol rate of modulated signal 126 at the receive end. This is because the clocks signals at the two ends may be independently generated (e.g., from independent oscillators). Even if the clock signals are adjusted to be nominally the same rate and are only slightly different, the resulting difference between the symbol rates can accumulate over time, which is sometimes referred to as "clock drift." This eventually leads to data underrun or data backup.

For instance, the symbol rate of modulated signal 126 may be faster than the symbol rate of modulated signal 112, which leads to a data underrun condition. Alternatively, the symbol rate of modulated signal 126 may be slower than the symbol rate of modulated signal 112, which leads to a data backup condition. The practical effects of such conditions can be quite significant. Just as an example, in an system carrying voice data, a data back up condition may cause noticeable audio delay.

Referring still to FIG. 1, communication of data in the other direction, from modem 110 to modem 102, may be carried out in a similar fashion and may suffer from the same problem. That is, modem 110 may send a modulated signal 128 to network device 108. Network device 108 may forward corresponding packets 130 over packet-based network 106 to network device 104. Network device 104 may send a modulated signal 132 to modem 102. Because of different clock signals, the symbol rate of modulated signal 126 may be different from the symbol rate of modulated signal 132. This again can lead to data underrun or data backup conditions.

Thus, there is a need to improve modem communications relayed over packet-based networks to compensate for unintended effects relating to the use of independent clocks.

BRIEF SUMMARY OF THE INVENTION

The present invention relates to methods, apparatuses, and systems for compensating for independent clocks in relayed modem communications involving (1) receiving data packets from a first network device, forwarded over a packet-based network, at a second network device, the data packets representing data transmitted in a first modulated signal from a first modem to the first network device, the first modulated signal including symbols associated with a first symbol rate based on a first clock, (2) placing data derived from the data packets into a queue in the second network device, (3) generating a second modulated signal at the second network device for transmission to a second modem, the second modulated signal being generated using data retrieved from the queue, the second modulated signal including symbols associated with a second symbol rate based on a second clock, (4) obtaining at least one queue size measurement associated with data placed in the queue in the second network device, and (5) effectively adjusting the second symbol rate, based on at least one queue size measurement associated with data placed in the queue in the second network device.

In one embodiment of the invention, the at least one queue size measurement comprises an average queue size measurement calculated from a first plurality of individual queue size measurements, and wherein the second symbol rate is adjusted based on a comparison of the average queue size measurement against a baseline value. The baseline value may be calculated from an initial plurality of individual queue size measurements.

The at least one queue size measurement may further comprise a subsequent average queue size measurement calculated from a second plurality of individual queue size measurements, and the second symbol rate may be effectively adjusted again based on a comparison of the subsequent average queue size measurement against the baseline value. According to one embodiment, the second plurality of individual queue size measurements include no common measurements included in the first plurality of individual queue size measurements. According to another embodiment, the second plurality of individual queue size measurements include some measurements included in the first plurality of individual queue measurement as well as at least one new measurement.

Each individual queue size measurement may be taken to coincide with a retrieval of data from the queue. For example, each individual queue size measurement may be taken prior to a retrieval of data from the queue. Alternatively, each individual queue size measurement may be taken after a retrieval of data from the queue.

The at least one queue size measurement may corresponds to at least one measured size of a buffer. The second symbol rate may be effectively adjusted by introducing a phase adjustment in the second modulated signal. An adjustment made to the second symbol rate may be restricted to a predetermined maximum limit. Upon occurrence of a known event, the at least one queue size measurement may be cleared and re-obtained to effectively adjust the second symbol rate.

BRIEF DESCRIPTION OF THE DRAWINGS

FIG. 4A depicts the calculation of average queue size measurements using non-overlapping windows.

FIG. 4B depicts the calculation of average queue size measurements using overlapping windows.

DETAILED DESCRIPTION OF THE INVENTION

Figure 1:
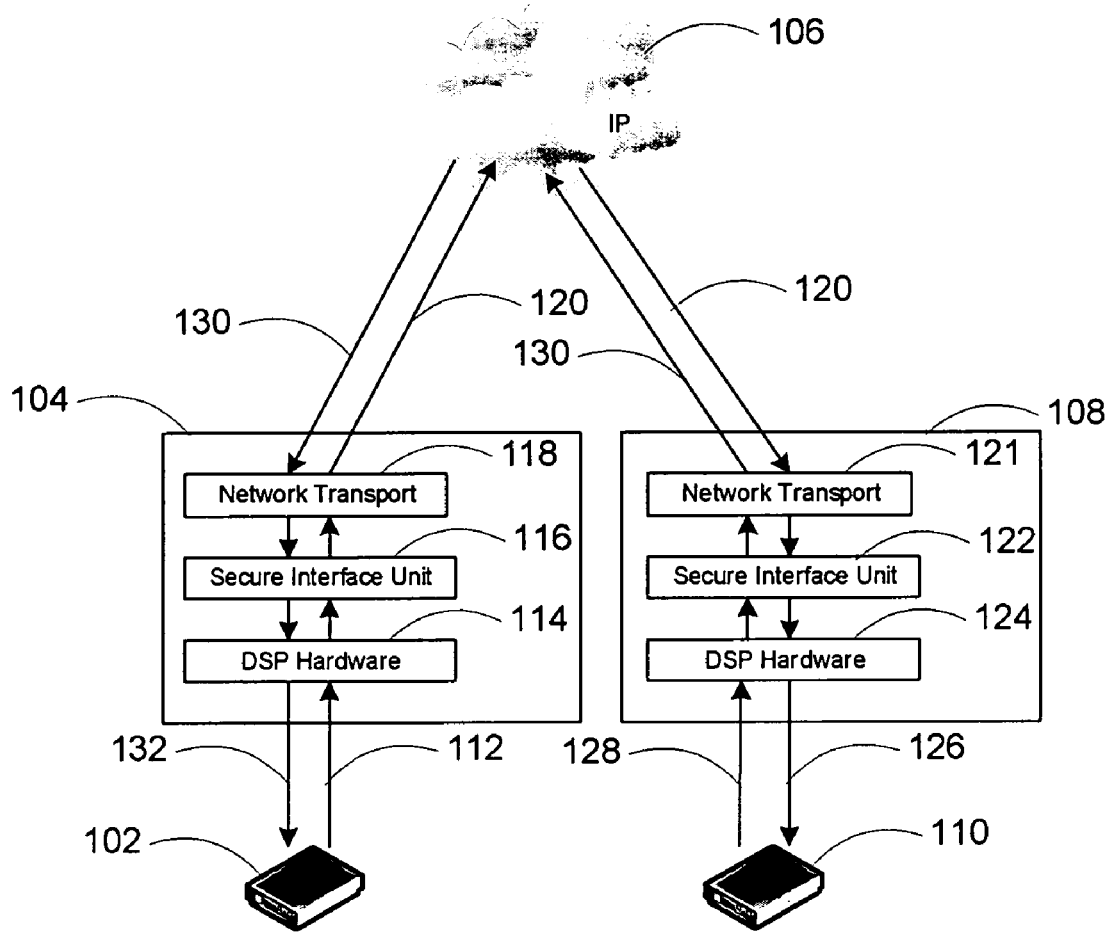
FIG. 1 depicts an illustrative environment in which relayed modem communication is carried out over a packet-based network.
Figure 2:
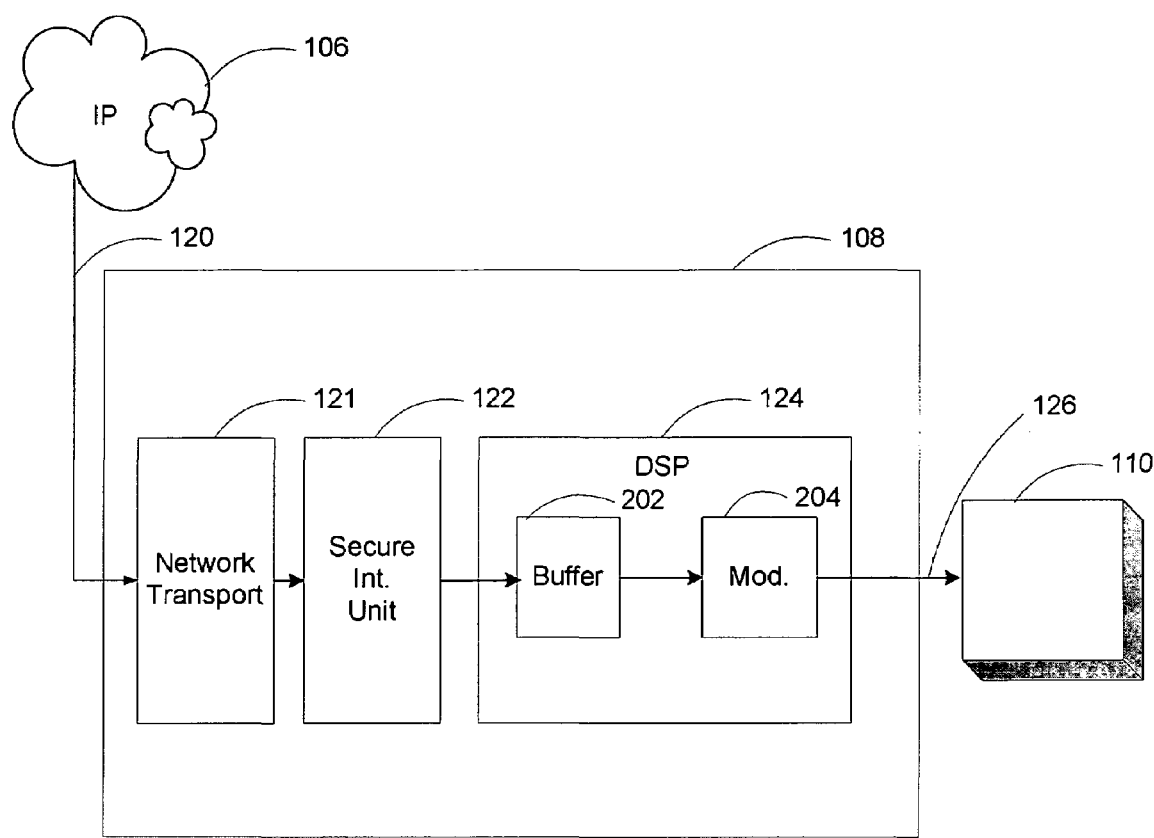
FIG. 2 is a block diagram of a network device capable of making adjustments to symbol rate for a modulated signal sent to a modem, in order to avoid data underrun and data backup conditions, in accordance with an embodiment of the present invention.

FIG. 2 is a block diagram of a network device 108 capable of making adjustments to symbol rate for a modulated signal sent to a modem, in order to avoid data underrun and data backup conditions, in accordance with an embodiment of the present invention. Network device 108 may receive packets 120 from packet-based network 106 and generate a modulated signal 126 that is sent to modem 110. Network device 108 includes network transport processing 121, security interface unit 122, and DSP hardware 124, as discussed previously. While network device 108 is described in detail below, a network device such as network device 104 having similar capabilities may also be employed to receive packets of data in the other direction. Thus, the present embodiment of the invention may be applied to bi-directional communications over a network.

Network device 108 monitors a queue of data that is derived from packets 120 and used to generate modulated signal 126, in order to adjust the symbol rate associated with modulated signal 126 send to modem 110, thereby avoiding data underrun and data backup conditions. Here, the queue of data is represented as a buffer 202 implemented in DSP hardware 124 and used to store data prior to modulation by a modulator 204. According to the present embodiment of the invention, both buffer 202 and modulator 204 are implemented in DSP hardware 124. In other implementations, functions performed by buffer 202 and modulator 204 may be implemented in software. Buffer 202 serves as a first-in-first-out (FIFO) buffer that receives data originating from packets 120 and outputs data to modulator 204. Network device 108 monitors the buffer size, i.e., the amount of data in buffer 202. Based on the buffer size, network device 108 makes appropriate adjustments to the symbol rate at which modulator 204 is operated.

While buffer 202 is used in the present embodiment of the invention to represent the queue of data monitored for purposes of making symbol rate adjustments, the queue need not be defined as a particular buffer in other embodiments. In fact, the queue of data monitored may span multiple buffers and may even include data being processed that is not stored in a buffer. Just as an example, the data queue may begin with the data that is extracted from packets 120 by network transport processing 121 and end with data that is about to be forwarded to modulator 204 by network device 108. In such an example, the queue of data would include data being processed by security interface unit 122, buffer 202, and any intermediate storage or processing components. Thus, demarcation of the beginning and end of the data queue that is monitored may vary depending on implementation.

As mentioned previously, the reason that modulator 204 may be operating at a symbol rate that does not coincide with the rate at which data is arriving via packets 120 is that modulator 204 may be utilizing a clock signal that is independent from the clock signal used to generate modulated signal 112 on the other side of packet-based network 106. The slight difference between the independent clock signals may be difficult to eliminate. Thus, according to the present embodiment of the invention, adjustments are made to the symbol rate of modulator 204, without changing the clock signal on which this symbol rate is based.

In one specific embodiment of the invention, the symbol rate is adjusted by controlling modulator 204 to adjust the phase of modulated signal 126. Changing the phase of modulated signal 126 alters the duration of each affected symbol within modulated signal 126. This effectively changes the symbol rate associated with modulated signal 126.

Figure 3:
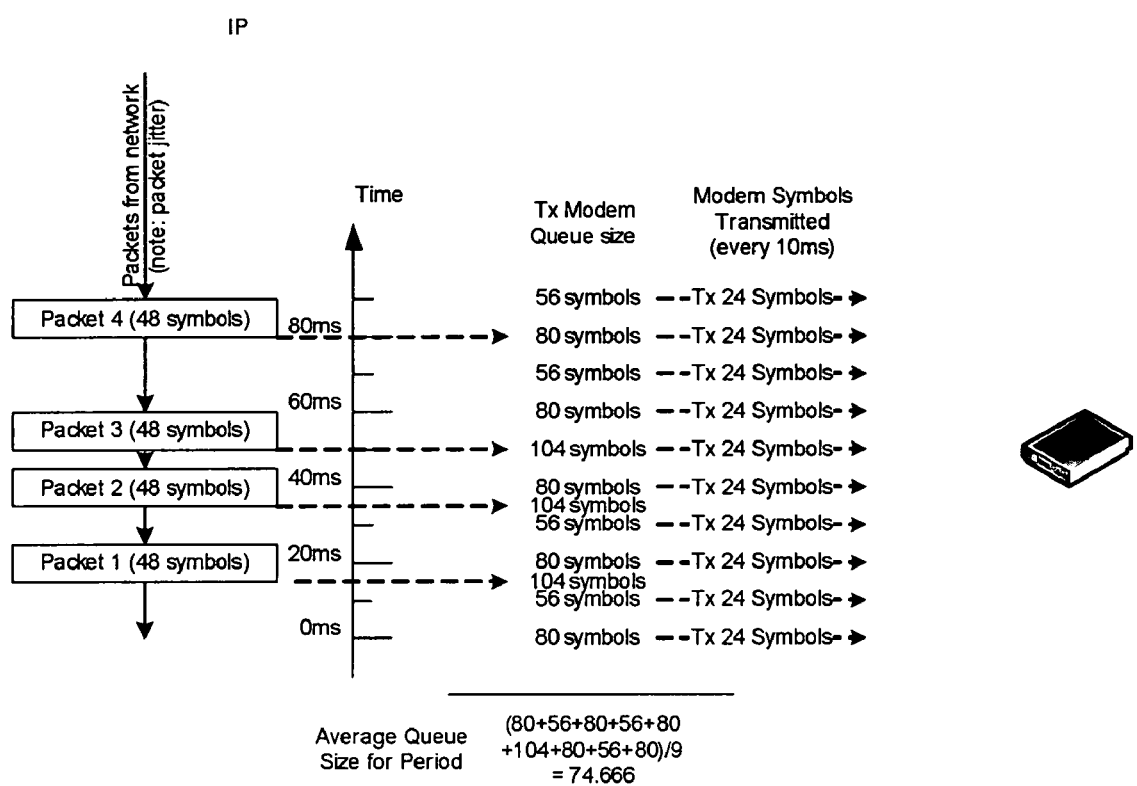
FIG. 3 shows an average queue size measurement in accordance with one embodiment of the invention.

FIG. 3 shows an average queue size measurement in accordance with one embodiment of the invention. Here, data is placed into the data queue each time a packet 120 arrives from network 120. Meanwhile, data is retrieved from the data queue each time a portion of data is sent to modulation unit 204 to generate modulated signal 126. Thus, the size of the data queue is constantly changing as data is inserted into the queue and retrieved out of the queue.

Changes in the queue size associated with inputs into the queue may occur at irregular time intervals. Generally speaking, packets 120 may not arrive at network device 108 from packet-based network 106 on a predictable, regular schedule. Indeed, the arrival of packets 120 can appear to be "jittery" or "asynchronous" because it is often difficult to predict the specific route taken through network 106, as well as the time of arrival, of each packet. Because packets 120 arrive asynchronously, the increases in queue size associated with packet arrivals also occur in an asynchronous fashion.

Given such irregularly timed increases in the size of the queue, a single measurement of the queue size can vary simply depending on when the measurement is taken. A measurement of the queue size taken just before a packet arrives would be different from a measurement taken just after the packet arrives. So, a single measurement may not be a dependable measure of the general status of the queue, e.g., a queue size indicating a underrun condition or a backup condition.

As shown in FIG. 3, an average queue size is used to "average out" variations in the queue size caused by the asynchronous manner by which packets arrive from the packet-based network. Here, the timing of when each individual measurement of the queue size is made coincides with a retrieval of data from the data queue. In the embodiment illustrated in FIG. 3, every time data is retrieved from the data queue for forwarding to modulation unit 204, just prior to the retrieval, a measurement is taken of the size of the data queue. In an alternative embodiment, every time data is retrieved from the data queue to forward to modulation unit 204, just after to the retrieval, a measurement is taken of the size of the data queue.

In this example, 24 symbols of data is retrieved from the data queue and sent to modulation unit 204 every 10 msec. Prior to each retrieval, an individual measurement of the queue size is taken. FIG. 3 depicts ten such individual queue size measurements taken at 0 msec, 10 msec, 20 msec, . . . , and so on. These ten individual queue sizes are (in symbols): 80, 56, 80, 56, 80, 104, 80, 56, 80, 56, 80. The first nine measurements are shown as being used to calculate an average queue size measurement of 74.666 symbols:

(80+56+80+56+80+104+80+56+80+56)/9=74.666

As FIG. 3 illustrates, even though packets 1 through 4 arrive at irregular time intervals to introduce jumps in the individual queue size measurements, such variations are "averaged out" by using the average data queue size measurement of 74.666 symbols, instead of any particular one of the individual data queue size measurements.

Here, the average measurement is shown as being calculated over a period of 90 msec. However, the average measurement may be calculated over a longer period of time, such as 500 msec or greater. The specific period of time over which an average is calculated can differ, depending on the implementation. Similarly, other parameters may be varied depending on the implementation. For example, the interval at which data is retrieved from the data queue and forwarded to modulation unit 204 is shown here as 10 msec. However, a different interval may be used depending on the specific implementation.

The above describes the calculation of a single average queue size measurement. Multiple ones of such average queue size measurements may be calculated over time and used in accordance with embodiments of the present invention. Different manners of obtaining multiple average queue size measurement are discussed in further detail below, including use of non-overlapping windows and overlapping windows.

FIG. 4A depicts the calculation of average queue size measurements using non-overlapping windows. Individual queue size measurements are represented as "x" marks. Here, the first nine individual queue size measurements are considered to be in a first window 410. These nine individual queue size measurements are used to calculate a first average queue size measurement. The next nine individual queue size measurements are considered a second window 412. Those nine individual queue size measurements are used to calculate a second average queue size measurement. Windows 410 and 412 are non-overlapping in the sense that they do not contain any common queue size measurements. The process is repeated to calculate additional average queue size measurements. Here, if the individual queue size measurements are taken at 10 msec intervals, a new average queue size measurement can be calculated every 90 msec. In this manner, multiple average queue size measurements may be obtained using non-overlapping windows.

FIG. 4B depicts the calculation of average queue size measurements using overlapping windows. Again, individual queue size measurements are represented as "x" marks. Here, the first nine individual queue size measurements are considered to be in a first window 420. These nine individual queue size measurements are used to calculate a first average queue size measurement. The last eight individual queues size measurements in window 420, plus a new individual queue size measurement, are together considered a second window 422. The nine individual queue size measurements in the second window 422 are used to calculate a second average queue size measurement. Windows 420 and 422 are overlapping in the sense that they share common queue size measurements. The process is repeated to calculate additional average queue size measurements. Here, if the individual queue size measurements are taken at 10 msec intervals, a new average queue size measurement can be calculated every 10 msec. In this manner, multiple average queue size measurements may be obtained using overlapping windows.

The use of overlapping windows as shown in FIG. 4B may require more computational resources than the use of non-overlapping windows in FIG. 4A. For one thing, the use of overlapping windows as shown in FIG. 4B involves calculating a new average queue size measurement every time a new individual measurement is obtained, e.g., every 10 msec. One advantage to the overlapping windows approach is that average queue size measurements are obtained more frequently, so adjustments to the symbol rate in response to changes in the size of the queue may also be made more frequently. This likely leads to smoother symbol rate adjustments, with individual adjustment having relatively smaller magnitudes. In some implementations, non-overlapping windows may be adopted in view of limited computational resources. In other implementations, overlapping windows may be adopted for better symbol rate adjustment performance. Thus, the approach chosen can depend on the specific needs of a particular implementation. Furthermore, variations on such approaches may also be adopted.

Figure 5:
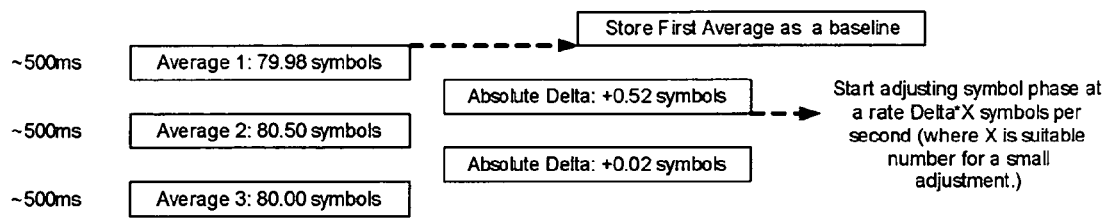
FIG. 5 illustrates use of average queue size measurements to adjust symbol rate, in accordance with an embodiment of the present invention.

FIG. 5 illustrates use of average queue size measurements to adjust symbol rate, in accordance with an embodiment of the present invention. In the example depicted here, it is assumed that a new average queue size measurement is obtained every 500 msec. According to the present embodiment of the invention, the first average queue size measurement is stored as a baseline value against which subsequent average queue size measurements may be compared. In other embodiments, a baseline value may simply be fixed at a predefined value.

In any case, once the baseline value is established, subsequent average queue size measurements are subtracted against the baseline value to generate an "absolute delta" value. In this example, the first average measurement, used as the baseline value, is 79.98 symbols. The second average queue size measurement is 80.50 symbols. So, the absolute delta value associated with the second average queue size measurement is +0.52 symbols. The third average queue size measurement is 80.00 symbols. So, the absolute delta value associated with the third average queue size measurement is +0.02 symbols.

According to the present embodiment of the invention, each absolute delta value calculated in this manner is used to determine a corresponding adjustment to the symbol rate of the relevant modulated signal. Here, the absolute delta value is multiplied by a scalar X to generate the proper adjustment to the symbol rate. The scalar X can be empirically calculated or determined by trial and error. For example, if a particular absolute delta value is 10 symbols, the scalar value is determined to be 0.061, then the calculation for the adjustment may be:

$$\text{adjustment} = X * \text{absolute delta}$$
$$= 0.061 * 10$$
$$= 0.61 \text{ symbols per sec}$$

The adjusted symbol rate that results is the previous symbol rate plus the adjustment. Thus, if the previous symbol rate is 2400 symbols per second, the adjusted symbol is:

$$\text{adjusted symbol rate} = \text{previous symbol rate} + \text{adjustment}$$
$$= 2400 \text{ symbols per sec} +$$
$$0.61 \text{ symbols per second}$$
$$= 2400.61 \text{ symbols per sec}$$

The adjustment is applied to the relevant modulated signal. For example, in FIG. 2, the symbol rate associated with modulated signal 126 may thus be repeated adjusted based on average queue size measurements corresponding to buffer 202. This process of calculating an adjustment based on a new average queue size measurement may be repeated each time a new average queue size measurement is obtained. Thus, the symbol rate is continually adjusted to control the average queue size, and data underrun and data backup conditions may be avoided.

According to one embodiment of the invention, a predetermined maximum limit is be applied to the symbol rate adjustment. An abrupt and sufficiently large change in the symbol rate of a modulated signal can sometimes cause the modem receiving the modulated signal to lose symbol or clock alignment as the modem demodulates the modulated signal. The lost of symbol or clock alignment may lead to bit errors, which can degrade the performance of the data transmission. A maximum limit on each symbol rate adjustment may help to prevent negative impacts such as loss of symbol or clock alignment on the demodulation system. The maximum limit may be determined as a general default value. Alternatively, the maximum limit may be determined based on the specific capabilities of the demodulation system.

According to one embodiment of the invention, certain known events can affect the size of the data queue being monitored, without necessarily indicating that an adjustment to the symbol rate of a modulated signal is required to prevent an imminent data underrun or data backup condition. For example, at the beginning of a transmission when the data queue is just beginning to be filled, or at the end of a transmission when the data queue is being emptied, the size of the queue is expected to be lower than any established baseline value. In such a scenario, network device 108 should not respond by making adjustments to decrease the symbol rate of modulated signal 126. Also, if at some point an interruption occurs in the arrival of packets 120, the queue size may drop below the baseline value. Again, network device 108 should not necessarily respond by decreasing the symbol rate. Instead, network device 108 may respond to such known events by resetting the symbol rate adjustment process and clearing the individual and/or average queue size measurements. After the reset, acquisition of the individual and/or average queue size measurements and adjustments to the symbol rate may be resumed. This allows fresh data untainted by the known event to be used, to make proper symbol rate adjustments.

The various calculations and operations performed with regard to obtaining individual and/or average queue size measurements, appropriate symbol rate adjustments, etc. may be performed using a resource such as DSP 124. Other hardware, software, or combination of hardware or software may be utilized in addition to or instead of DSP 124 may also be used as is known in the art.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for compensating for independent clocks in relayed modem communications comprising:
   receiving data packets from a first network device, forwarded over a packet-based network, at a second network device, the data packets representing data transmitted in a first modulated signal from a first modem to the first network device, the first modulated signal including symbols associated with a first symbol rate based on a first clock;
   placing data derived from the data packets into a queue in the second network device;
   generating a second modulated signal at the second network device for transmission to a second modem, the second modulated signal being generated using data retrieved from the queue, the second modulated signal including symbols associated with a second symbol rate based on a second clock;
   obtaining at least one queue size measurement associated with data placed in the queue in the second network device; and
   effectively adjusting the second symbol rate, based on at least one queue size measurement associated with data placed in the queue in the second network device.

2. The method of claim 1 wherein the at least one queue size measurement comprises an average queue size measurement calculated from a first plurality of individual queue size measurements, and wherein the second symbol rate is adjusted based on a comparison of the average queue size measurement against a baseline value.

3. The method of claim 2 wherein the baseline value is calculated from an initial plurality of individual queue size measurements.

4. The method of claim 2 wherein the at least one queue size measurement further comprises a subsequent average queue size measurement calculated from a second plurality of individual queue size measurements, and the second symbol rate is effectively adjusted again based on a comparison of the subsequent average queue size measurement against the baseline value.

5. The method of claim 4 wherein the second plurality of individual queue size measurements include no common measurements included in the first plurality of individual queue size measurements.

6. The method of claim 4 wherein the second plurality of individual queue size measurements include some measurements included in the first plurality of individual queue measurement as well as at least one new measurement.

7. The method of claim 2 wherein each individual queue size measurement is taken to coincide with a retrieval of data from the queue.

8. The method of claim 7 wherein each individual queue size measurement is taken prior to a retrieval of data from the queue.

9. The method of claim 7 wherein each individual queue size measurement is taken after a retrieval of data from the queue.

10. The method of claim 1 wherein the at least one queue size measurement corresponds to at least one measured size of a buffer.

11. The method of claim 1 wherein the second symbol rate is effectively adjusted by introducing a phase adjustment in the second modulated signal.

12. The method of claim 1 wherein an adjustment made to the second symbol rate is restricted to a predetermined maximum limit.

13. The method of claim 1 wherein, upon occurrence of a known event, the at least one queue size measurement is cleared and re-obtained to effectively adjust the second symbol rate.

14. An apparatus for compensating for independent clocks in relayed modem communications comprising:
   a second network device capable of receiving data packets forwarded over a packet-based network from a first network device, the data packets representing data transmitted in a first modulated signal from a first modem to the first network device, the first modulated signal including symbols associated with a first symbol rate based on a first clock;
   wherein the second network device is capable of placing data derived from the data packets into a queue;
   wherein the second network device is capable of generating a second modulated signal for transmission to a second modem, the second modulated signal being generated using data retrieved from the queue, the second modulated signal including symbols associated with a second symbol rate based on a second clock;
   wherein the second network device is capable of obtaining at least one queue size measurement associated with data placed in the queue in the second network device; and
   wherein the second network device is capable of effectively adjusting the second symbol rate, based on at least one queue size measurement associated with data placed in the queue in the second network device.

15. The apparatus of claim 14 wherein the at least one queue size measurement comprises an average queue size measurement calculated from a first plurality of individual queue size measurements, and wherein the second symbol rate is adjusted based on a comparison of the average queue size measurement against a baseline value.

16. The apparatus of claim 15 wherein the baseline value is calculated from an initial plurality of individual queue size measurements.

17. The apparatus of claim 15 wherein the at least one queue size measurement further comprises a subsequent average queue size measurement calculated from a second plurality of individual queue size measurements, and the second symbol rate is effectively adjusted again based on a comparison of the subsequent average queue size measurement against the baseline value.

18. The apparatus of claim 17 wherein the second plurality of individual queue size measurements include no common measurements included in the first plurality of individual queue size measurements.

19. The apparatus of claim 17 wherein the second plurality of individual queue size measurements include some measurements included in the first plurality of individual queue measurement as well as at least one new measurement.

20. The apparatus of claim 15 wherein each individual queue size measurement is taken to coincide with a retrieval of data from the queue.

21. The apparatus of claim 20 wherein each individual queue size measurement is taken prior to a retrieval of data from the queue.

22. The apparatus of claim 20 wherein each individual queue size measurement is taken after a retrieval of data from the queue.

23. The apparatus of claim 14 wherein the at least one queue size measurement corresponds to at least one measured size of a buffer.

24. The apparatus of claim 14 wherein the second symbol rate is effectively adjusted by introducing a phase adjustment in the second modulated signal.

25. The apparatus of claim 14 wherein an adjustment made to the second symbol rate is restricted to a predetermined maximum limit.

26. The apparatus of claim 14 wherein, upon occurrence of a known event, the at least one queue size measurement is cleared and re-obtained to effectively adjust the second symbol rate.

27. A system for compensating for independent clocks in relayed modem communications comprising:
- means for receiving data packets from a first network device, forwarded over a packet-based network, at a second network device, the data packets representing data transmitted in a first modulated signal from a first modem to the first network device, the first modulated signal including symbols associated with a first symbol rate based on a first clock;
- means for placing data derived from the data packets into a queue in the second network device;
- means for generating a second modulated signal at the second network device for transmission to a second modem, the second modulated signal being generated using data retrieved from the queue, the second modulated signal including symbols associated with a second symbol rate based on a second clock;
- means for obtaining at least one queue size measurement associated with data placed in the queue in the second network device; and
- means for effectively adjusting the second symbol rate, based on at least one queue size measurement associated with data placed in the queue in the second network device.

* * * * *